INVENTORS:
JOHN L. BJELLAND
FLOYD W. FLYNN

INVENTORS:
JOHN L. BJELLAND
FLOYD W. FLYNN

ATTORNEYS

Aug. 25, 1959   J. L. BJELLAND ET AL   2,900,869
STOP RATIONER FOR PHOTOENGRAVING CAMERA
Filed July 19, 1957   3 Sheets-Sheet 3

INVENTORS:
JOHN L. BJELLAND
FLOYD W. FLYNN
BY
ATTORNEYS

United States Patent Office 2,900,869
Patented Aug. 25, 1959

2,900,869

STOP RATIONER FOR PHOTOENGRAVING CAMERA

John L. Bjelland, Huntington, and Floyd W. Flynn, Glen Cove, N.Y., assignors to Powers Chemco, Inc., Glen Cove, N.Y., a corporation of New York Application July 19, 1957, Serial No. 672,896

7 Claims. (Cl. 88—24)

This invention relates generally to high precision cameras of the photoengraving type and has particular relation to a stop rationer for such cameras for adjusting the iris opening and indicating the $f$:stops for various negative to copy size ratios.

Objects and advantages of the invention will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention and together with the description, serve to explain the principles of the invention.

Figure 1:
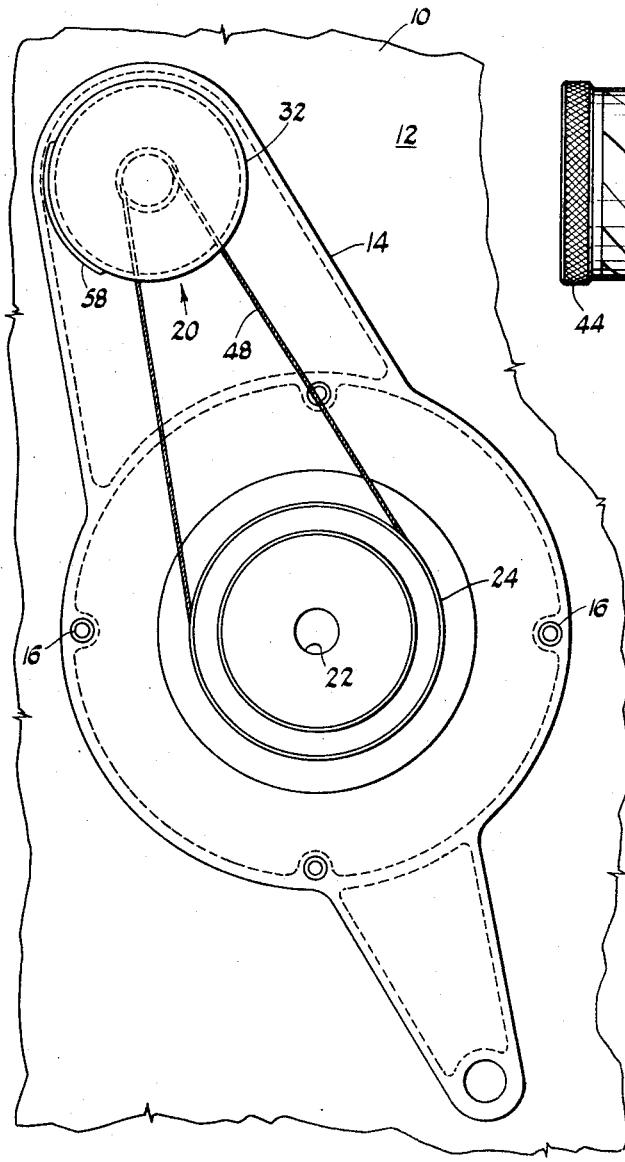
Figure 1 is a fragmentary elevational view of the front of a photoengraving camera that is equipped with the present invention.
Figure 2:
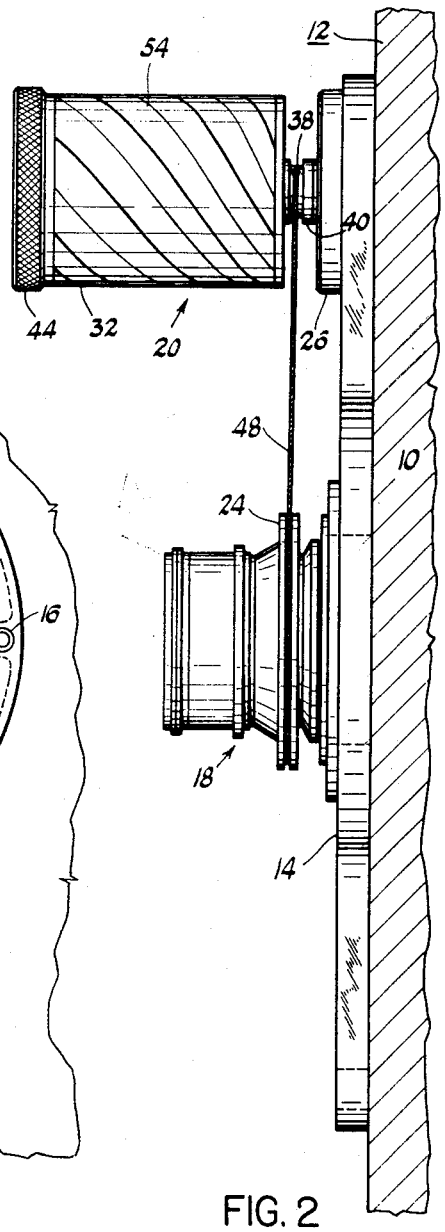
Figure 2 is a fragmentary elevational view of the front portion of the camera and is taken generally from line 2—2 of Figure 1.
Figure 4:
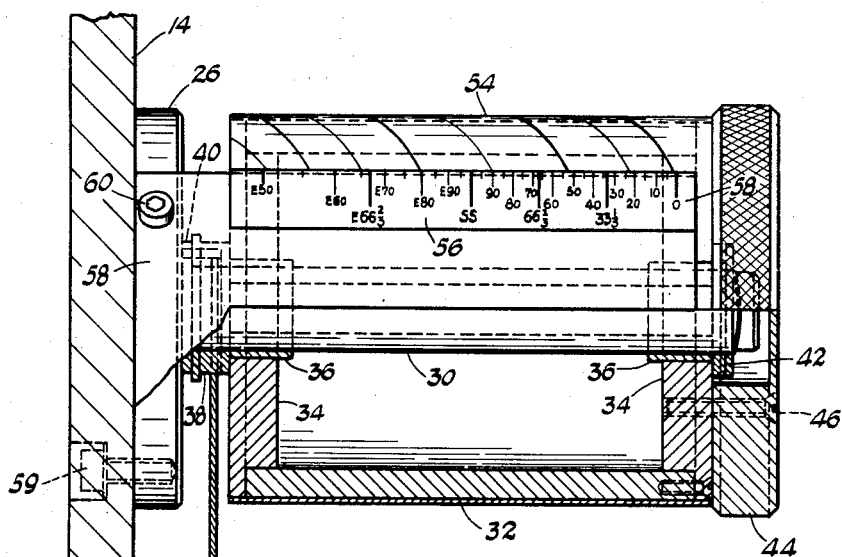
Figure 4 is a fragmentary side view of the drum assembly partially in section with the section taken along line 4—4 of Figure 3.
Figure 3:
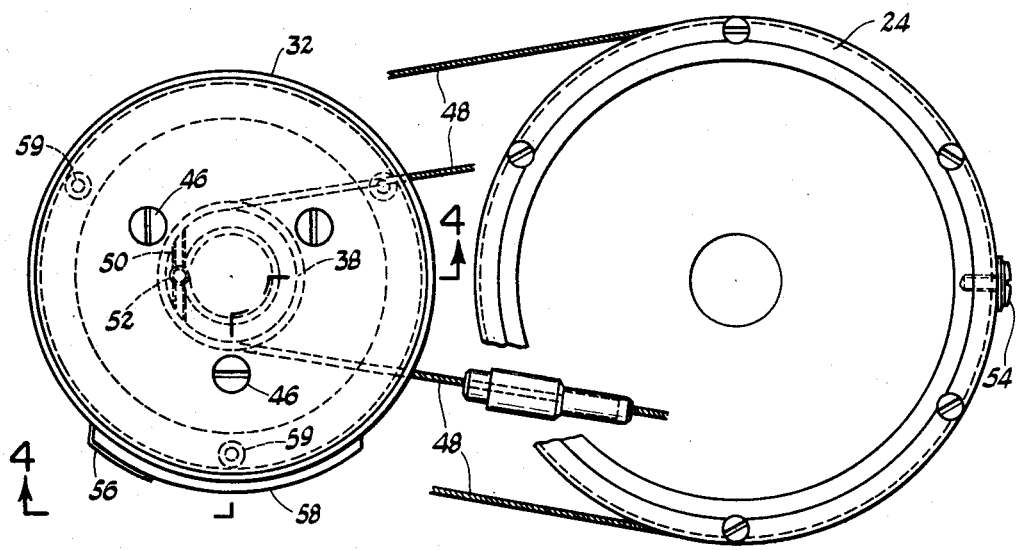
Figure 3 is a front view of the stop rationer drum assembly and the iris ring at an enlarged scale relative to that of Figs. 1 and 2 and showing the cable drive interconnecting the drum assembly and the iris ring.

The present invention has for its object the provision of an improved apparatus for adjusting the iris diaphragm opening of a photoengraving camera and providing a correct indication of the $f$:stops of such adjustments throughout a range of negative to copy size ratio settings of the camera. Another object is to provide such an apparatus wherein the adjusting and indicating mechanism for the iris diaphragm are mounted on the front of the camera in laterally spaced relation to the lens assembly which carries the iris diaphragm so that they are conveniently accessible.

A further object is to provide such an apparatus wherein the adjusting and indicating mechanism takes the form of a rotatable drum assembly mounted on the front of the camera in laterally spaced relation with the lens assembly and interconnected with the iris ring of the lens assembly through a flexible cable drive so that the iris opening is adjusted by rotation of the drum assembly.

Another object is to provide in such an organization a pair of scales one of which is disposed about the drum and moves therewith and the other of which is stationarily mounted adjacent the drum periphery and extends axially of the drum with these scales being constructed and arranged to indicate the correct $f$:stop of the particular iris opening for any desired negative to copy size ratio within the operating range of the camera. Still another object is to provide such an apparatus wherein the drum assembly and the lens assembly are mounted on a common support plate which is in turn mounted on the front of the camera thereby providing for assembly and disassembly of this apparatus as a unit. Another object is to provide a stop rationer which is mounted on the camera at a location where it is conveniently accessible and at the same time provides for a simple, economical and reliable interconnection with the iris ring of the lens assembly.

In the operation of precision cameras, such as photoengraving cameras and particularly in the production of halftone negatives with these latter cameras it is essential that the correct $f$:stop for a particular adjustment of the iris diaphragm be accurately known. Since, as it is well recognized, the $f$:stop value for a particular opening of the diaphragm varies as the camera setting is varied to produce or operate at different negative to copy size ratios, or in other words at different enlargements or reductions of the copy, some way must be provided to indicate the correct $f$:stops for the adjustment of the iris diaphragm throughout the range of negative to copy size ratios over which the camera may operate. According to the preferred embodiment of the present invention this is accomplished by mounting a drum assembly on the front of such a camera in laterally spaced relation with the lens assembly. This drum assembly is rotatable about its axis, which is parallel to that of the lens assembly, and both the drum assembly and lens assembly are mounted on a common support plate which is attached to the front of the camera. The drum assembly is manually rotatable and its rotation is transferred to the iris ring of the lens assembly through a belt type drive in the form of a flexible cable wound around a portion of the drum assembly and trained over the iris ring. About the drum is provided a cylindrical scale in the form of helical lines indicating different $f$:stops while immediately adjacent the drum periphery and extending axially of the drum is a linear scale having indices indicating different negative to copy size ratios with these scales being arranged so that they index with each other to provide an indication of the correct $f$:stop for iris diaphragm adjustments for various negative to copy size ratios.

It will be understood that the foregoing general description and the following detailed description as well are exemplary and explanatory of the invention but are not restrictive thereof.

Referring now to the drawings, wherein like reference characters are used throughout to designate like elements, the illustrative and preferred embodiments of the invention depicted therein includes a photoengraving camera indicated generally as 10 and on the front face 12 of which is mounted support plate 14 by means of the several bolts 16. Mounted on the support plate 14 is the lens assembly 18 of the camera as well as the drum assembly 20 of the stop rationer so that these two assemblies and the support plate may be mounted on and removed from the camera as a unit. The lens assembly 18 is of the usual construction and includes an iris diaphragm represented as 22 and an iris ring 24 operatively connected with the diaphragm 22 in a conventional and well known manner so that by rotation of the ring the opening of the diaphragm may be varied as desired within the limits of its operation.

Figure 5:
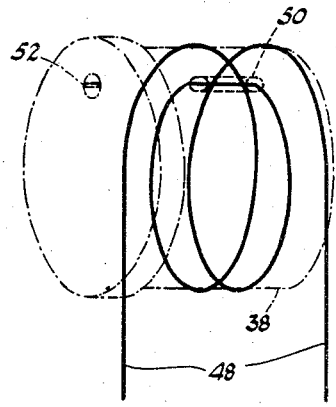
Figure 5 is a view in the nature of a perspective showing how the cable is wrapped around and secured to the sheave which forms a portion of the drum assembly.

Rotation of iris ring 24 and accordingly adjustment of the opening of the diaphragm 22 is effected by means of drum assembly 20. This drum assembly comprises a base member 26 that is secured to support plate 14 by means of cap screws 28 and extending forwardly from this base in generally parallel relation with the axis of lens assembly 18 is shaft 30. Journaled to this shaft is the cylindrical member or drum 32 which includes the spaced end plates 34 each of which are suitably bored to receive one of the bushings 36 that are disposed on the shaft. At the inner end of cylindrical member 32 is sheave or pulley 38 which is secured to the adjacent end plate 34 by suitable screws (not shown) with the inner end of this pulley engaging a suitable thrust bearing 40. At the outer end of shaft 30 is another thrust bearing 42 and these bearings are effective to prevent axial movement of cylindrical member 32 on shaft 30. Cylindrical member or drum 32 is rotated about its axis by means of the knurled operating knob 44 which is secured to the outer end of the drum, and specifically to the end plate 34 forming the outer end of the drum, by means of screws 46. This rotation of drum 32 is effective to rotate iris ring 24 by means of a suitable endless belt drive interconnecting the drum assembly and the iris ring with this drive preferably comprising a braided flexible cable 48 having its ends secured to the adjustable connector 50. This cable is trained over the iris ring with the ring being suitably grooved to receive the cable and the cable is also wound around the sheave 38 in the manner shown in Figure 5 with there being two and one half turns of the cable taken about this sheave and with the cable passing through a suitable bore 50 provided in the sheave and secured within this bore by means of set screw 52 that extends from the end of the sheave and engages the cable. Positive movement of the iris ring by means of cable drive 48 is assured by adjustable clamp screw 54 which when tightened down prevents relative movement between the cable drive and the iris ring. Thus, through this cable drive the cameraman or operator is able to adjust the iris diaphragm through manipulation of the drum assembly 20 which may be manually rotated about its axis as desired by means of the actuating knob 44.

Figure 7:
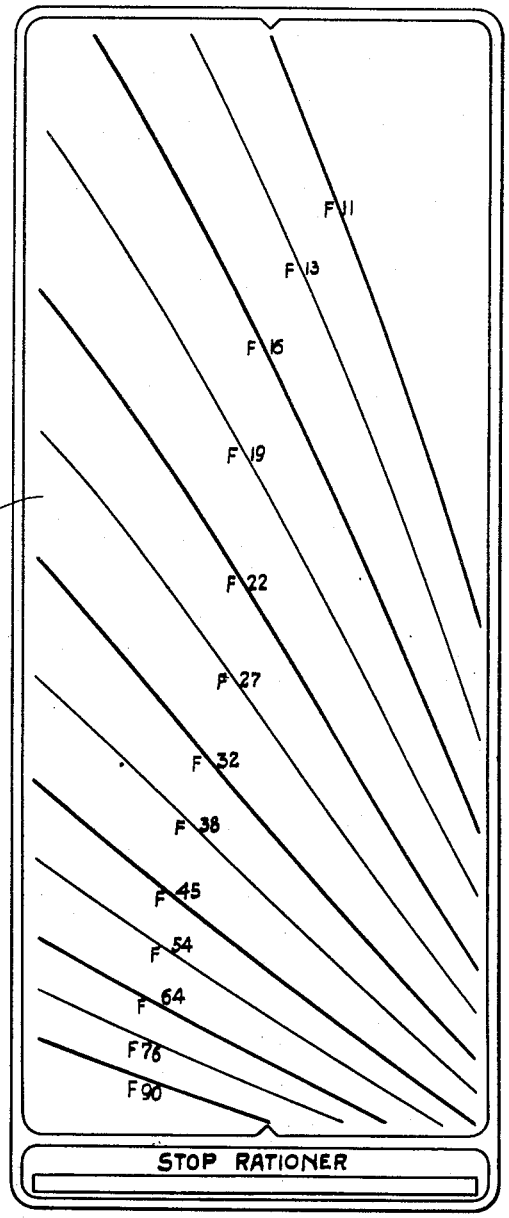
Figure 7 is a development of the cylindrical scale that is wrapped around or disposed on the periphery of the drum.
Figure 6:
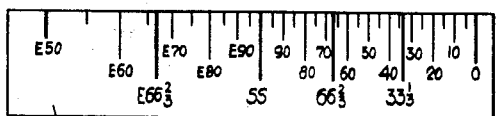
Figure 6 is an enlarged view of the linear scale which is stationarily mounted adjacent the periphery of the drum.

In order to indicate the $f$:stop for any desired opening of the iris diaphragm throughout the range of negative to copy size ratios of operation of the camera there is provided, as part of the drum assembly 20, a pair of scales that provide such an indication. Mounted on or wrapped around drum 32 is scale 54 which is shown in development in Figure 7 and which is formed of lines each of which represents a different $f$:stop. This scale may be laid out on a separate piece of paper or the like and then mounted on the periphery of drum 32 by being wrapped around the drum and secured to its periphery, with the $f$:stop lines then being generally helical lines which are spaced axially along the drum. In adjacent relation to the periphery of drum 32 and accordingly scale 54 is the linear scale 56 which, as best shown in Figure 6, is provided with indices representing various negative to copy size ratios as for example E50 represents an enlargement where the negative is twice the size of the copy, SS represents a negative and copy of the same size while 50 (on the right side of the scale) represents a reduction where the negative is one-half the size of the copy. The scale 56 is mounted on the upper end of the arcuate base plate 58 that is secured to base member 26 by screws 60 and extends longitudinally of the drum in adjacent overlying relation to the drum's periphery. Therefore, percentage or negative to copy size ratio scale 56 extends longitudinally of drum 32 throughout substantially its entire length with the indices of this scale being immediately adjacent the cylindrical scale 54 disposed about the drum periphery. By means of these two scales the camera may be adjusted to any $f$:stop for any of the negative to copy size ratios that appear on scale 56 with it merely being necessary to rotate drum 32 to where the particular negative to copy size ratio to which the camera is set is indexed with the desired $f$:stop indicated on scale 54. With this arrangement it is then a simple matter to adjust the camera for the proper $f$:stops required in the detail, highlight and flash exposures that are generally made in obtaining a single halftone negative.

It will be noted that sheave 38 is of substantially smaller diameter than both iris ring 24 and drum 32. This has the effect of providing a drive reduction enabling the operator, through manipulation of knob 44, to accurately adjust the iris ring and also enables the circumferential dimension of scale 54 to be substantially larger than would otherwise be the case so that the scales provide a more accurate indication of the $f$:stop.

By means of the adjustable screw 53 the relative positions of the iris ring and the drum assembly may be varied with this being accomplished by loosening this screw and slipping cable 48 about iris ring 24. This is necessary in initially assembling the stop rationer so that the scales are properly indexed or calibrated with relation to the diaphragm opening. After effecting this initial adjustment this set screw 53 is tightened to secure the cable to the iris ring with the stop rationer then being ready for operation.

With this invention both the manipulator and the indicator for the iris diaphragm are mounted on the front of the camera and are interconnected with the lens assembly in a simple manner so that adjustment of the iris diaphragm is conveniently accessible and a correct indication of the $f$:stop is provided throughout the range of negative to copy size ratios at which the camera is operated.

The invention in its broader aspects is not limited to the specific mechanism shown and described but departures may be made therefrom, within the scope of the accompanying claims, without departing from the principles of the invention and without sacrificing its chief advantages.

What is claimed is:

1. In a photoengraving camera adapted to produce negatives of varying size relative to the copy the combination of a lens assembly having an adjustable iris diaphragm, an iris ring operatively associated with the iris diaphragm to adjust the same to vary the opening thereof by rotating the ring, an axially rotatable drum mounted on the front of the camera laterally of the lens assembly and in generally parallel relation with the lens axis, a belt drive interconnecting said drum and said ring so that they rotate together whereby the iris diaphragm may be adjusted by rotation of said drum, a negative to copy size ratio scale and an $f$:stop scale associated with said rotatable drum with one of said scales being disposed about the rotatable drum for rotation therewith and comprised of helical lines and the other being stationarily mounted adjacent said one scale and longitudinally of the drum for indexing therewith and with the scales being arranged to indicate the $f$:stop of the iris opening for any desired image to copy ratios throughout the range of adjustment effected by the rotatable drum.

2. In a photoengraving camera adapted to produce negatives of varying size relative to the copy the combination of a lens assembly having an adjustable iris diaphragm, an iris ring operatively associated with the iris diaphragm to adjust the same to vary the opening thereof by rotating the ring, a manually operable rotatable drum means mounted on the front of the camera laterally of the lens assembly and having its axis generally parallel with the lens axis, a belt drive means interconnecting the rotatable drum means with the iris ring so that rotation of the former will rotate the latter, said means comprising an endless drive member disposed over pulley means forming part of the rotatable drum means and also a pulley means on the iris ring with the diameter of the latter being substantially greater than that of the former, and means associated with said rotatable drum means for providing a correct indication of the $f$:stop of the iris opening for various settings of the camera to produce various negative sizes relative to the copy size and including a scale indicating the proportional negative and copy sizes and a scale indicating the $f$:stops with one of these scales being in the form of a helical line for each value on the scale disposed about the rotatable drum means for rotation therewith and the other scale being stationarily mounted adjacent the rotatable scale and longitudinally of the drum means and providing an index for the movable scale.

3. In an organization of the type described, the combination of a support plate adapted to be removably mounted on the front of a photoengraving camera, a lens assembly carried by said support plate and including an iris diaphragm and a rotatable iris ring for adjusting the same, a drum mounted on said plate for rotation about its axis and extending forwardly from said plate in generally parallel relation with the lens assembly axis, said drum being laterally spaced from the lens assembly but operatively connected with the iris ring at a fixed ratio such that rotation of the drum rotates the ring, a pair of scales associated with said drum and operative to indicate the various $f$:stops throughout the range of adjustment of the iris diaphragm for various negative to copy size ratios and including a scale disposed about said drum in the form of helical lines for rotation therewith and a stationary linear scale extending longitudinally of the drum adjacent the drum periphery for indexing with the first mentioned scale, one of said scales indicating $f$:stops and the other indicating negative to copy size ratios.

4. In a photoengraving camera operable at varying negative to copy size ratios the combination of a support plate adapted to be removably mounted on the front of the camera, a lens assembly carried by said support plate and including an iris diaphragm and a rotatable iris ring for adjusting the same, a cylindrical member mounted on said plate laterally of the plate assembly and extending forwardly therefrom with its axis generally parallel with that of the lens assembly, drive means interconnecting said cylindrical member and said iris ring at a fixed ratio such that rotation of the cylindrical member rotates the ring through a smaller angular distance, a reference scale carried by said cylindrical member in the form of helical lines about the periphery thereof, a fixed reference scale extending longitudinally of the cylindrical member and adjacent the periphery thereof for indexing with the first mentioned scale, the indices on one of the scales representing $f$:stops and those of the other scale representing negative to copy size ratios and with the indices being arranged to provide an indication of the $f$:stops for various negative to copy side ratios throughout the range of adjustment of the iris ring by the cylindrical member.

5. The organization of claim 4 wherein the scale carried by the cylindrical member represents $f$:stops and the stationary scale represents negative to copy size ratios.

6. In an organization of the type described the combination of a lens assembly mounted on the front of a photoengraving camera and including an iris diaphragm and an iris ring for adjusting the same, a cylindrical drum mounted on the front of the camera in laterally spaced relation with the lens assembly and extending forwardly from the camera front with its axis generally parallel with that of the lens assembly and with the drum being manually rotatably adjustable about its axis, pulley means coaxial with said drum and rotatable therewith with said pulley means being of substantially smaller diameter than the drum and the iris ring, a belt type drive disposed about the pulley means and over the iris ring so that rotation of the drum rotates the iris ring through a lesser angular increment, adjustable means releasably securing the belt to the one of these members, an $f$:stop scale about the periphery of said drum and comprised of axially spaced helical lines representing the various $f$:stops, a linear scale stationarily mounted adjacent the periphery of the drum and extending longitudinally thereof, said linear scale having indices representing various ratios of negative to copy size for indexing with the cylindrical scale to indicate the $f$:stops for desired negative to copy size ratios through the range of adjustment of the iris ring effected by the drum.

7. In a photoengraving camera the combination of a support plate adapted to be removably secured to the front of the camera, a lens assembly mounted on said plate and including an adjustable iris diaphragm and a rotatable iris ring operative to vary the opening in said diaphragm, a support shaft carried by said plate and extending laterally therefrom in parallel relation with the axis of the lens assembly and laterally spaced with respect thereto, a cylindrical member coaxial with and journaled to said shaft and carrying at its inner end a pulley means of substantially smaller diameter than the cylindrical member and the iris ring, a cable drive interconnecting this pulley means and the iris ring so that rotation of the cylindrical member effects rotation of the iris ring with the cable drive being disposed about the pulley means and the iris ring, means for rotating the cylindrical member about the axis of said support shaft, a scale provided on the periphery of the cylindrical member and having indices in the form of axially spaced helical lines each of which represents a particular $f$:stop, and a stationary linear scale extending longitudinally of the cylindrical member in adjacent relation to the periphery thereof for indexing with the scale thereon with said linear scale having indices representing various negative to copy size ratios, said scales being constructed to provide an accurate indication of the $f$:stops for various negative to copy size ratios throughout the range of adjustment of the iris diaphragm by the cylindrical member.

References Cited in the file of this patent

UNITED STATES PATENTS

| | | |
|---|---|---|
| 1,289,129 | Douthitt | Dec. 31, 1918 |
| 1,309,398 | Douthitt | July 8, 1919 |
| 1,520,185 | Johnson | Dec. 23, 1924 |
| 2,462,937 | Bernard | Mar. 1, 1949 |
| 2,489,804 | Newick | Nov. 29, 1949 |